United States Patent
Isogai et al.

(10) Patent No.: US 6,265,990 B1
(45) Date of Patent: Jul. 24, 2001

(54) APPARATUS AND METHOD FOR CONTROLLING A DISTANCE BETWEEN TWO TRAVELING VEHICLES AND A RECORDING MEDIUM FOR STORING THE CONTROL METHOD

(75) Inventors: Akira Isogai, Anjo; Eiji Teramura, Okazaki; Takao Nishimura, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/353,944

(22) Filed: Jul. 15, 1999

(30) Foreign Application Priority Data

Jul. 17, 1998 (JP) .................................................. 10-203713
Apr. 28, 1999 (JP) .................................................. 11-121887

(51) Int. Cl.$^7$ ...................................................... G08G 1/16
(52) U.S. Cl. ........................... 340/903; 340/435; 340/436; 701/301
(58) Field of Search ................................. 340/903, 435, 340/436, 441, 438; 701/301; 180/197

(56) References Cited

U.S. PATENT DOCUMENTS

| | | | |
|---|---|---|---|
| 5,420,792 | 5/1995 | Butsuen et al. | 364/426.04 |
| 5,485,155 | 1/1996 | Hibino | 342/70 |
| 5,574,463 | 11/1996 | Shirai et al. | 342/70 |
| 5,574,644 | 11/1996 | Butsuen et al. | 364/426.04 |
| 5,627,511 | 5/1997 | Takagi et al. | 340/445 |
| 5,631,639 | 5/1997 | Hibino et al. | 340/903 |
| 5,684,473 | 11/1997 | Hibino et al. | 340/903 |
| 5,710,565 | 1/1998 | Shirai et al. | 342/70 |
| 5,751,211 | 5/1998 | Shirai et al. | 340/435 |
| 5,754,099 | 5/1998 | Nishimura et al. | 340/435 |
| 5,798,727 | 8/1998 | Shirai et al. | 342/70 |
| 5,805,527 | 9/1998 | Hoashi et al. | 367/99 |
| 5,818,355 | 10/1998 | Shirai et al. | 340/903 |
| 5,864,391 | 1/1999 | Hosokawa et al. | 356/4.01 |

FOREIGN PATENT DOCUMENTS

| | | |
|---|---|---|
| 58-139214 | 8/1983 | (JP) . |
| 2-10000 | 1/1990 | (JP) . |
| 5-278581 | 10/1993 | (JP) . |
| 6-131597 | 5/1994 | (JP) . |
| 7-132785 | 5/1995 | (JP) . |
| 8-268191 | 10/1996 | (JP) . |
| 2574886 | 4/1998 | (JP) . |

Primary Examiner—Daryl Pope
(74) Attorney, Agent, or Firm—Pillsbury Winthrop LLP

(57) ABSTRACT

At least one of a plurality of deceleration devices is selected to decelerate a succeeding vehicle. A warning is generated only when a deceleration level attainable by the selected one or plural deceleration devices is higher than a predetermined maximum level even if the distance between two traveling vehicles is shorter than a predetermined warning distance.

38 Claims, 13 Drawing Sheets

ACCELERATOR CLOSING CONTROL SUBROUTINE

CONTROL-OFF OUTPUT GENERATING SUBROUTINE (1)

CONTROL-OFF OUTPUT GENERATING SUBROUTINE (2)

APPARATUS AND METHOD FOR CONTROLLING A DISTANCE BETWEEN TWO TRAVELING VEHICLES AND A RECORDING MEDIUM FOR STORING THE CONTROL METHOD

BACKGROUND OF THE INVENTION

The present invention relates to an apparatus and a method for controlling a distance between two traveling vehicles and a recording medium for storing the control method.

To improve the safety in a vehicle driving operation and reduce the driver's burden, an apparatus for automatically controlling a distance between two traveling vehicles is conventionally proposed. For example, a relative speed between the system's vehicle and a preceding vehicle is obtained. A target distance is determined in accordance with the detected relative speed (i.e., speed deviation between two vehicles). An actual distance between the system's vehicle and the preceding vehicle is detected. To eliminate the distance deviation between the actual distance and the target distance, an appropriate target acceleration is set to control an internal combustion engine of the vehicle and/or a braking apparatus so as to realize the target acceleration.

In an automotive vehicle, there are a plurality of deceleration devices which are independently operable to decelerate the vehicle. To adjust the distance between two traveling vehicles, appropriate one or plural deceleration devices are generally selectable in accordance with the target acceleration.

Meanwhile, there is a warning device which generates a warning or alarm to caution the driver against upcoming danger when the distance between two traveling vehicles becomes short. For example, the warning is a buzzer, an indicator or the like, in response to which the driver depresses a braking pedal to give a sufficient braking force to wheels.

However, the warning operation is conventionally independent from the automatic distance control. The condition of the deceleration devices actuated during the automatic distance control is not taken into consideration in the judgement of the warning operation. In some cases, the warning may be issued awkwardly or unexpectedly even if the automatic control apparatus has a sufficient capability of recovering the distance between two vehicles by continuing the automatic distance control. In such cases, the warning operation may not fit to driver's feeling.

SUMMARY OF THE INVENTION

In view of the foregoing, the present invention has an object to solve the problems caused by the conventional distance control method.

An object of the present invention is to provide a control apparatus and a method capable of optimizing the relationship between the automatic distance control and the warning operation so as to fit to driver's feeling.

An object of the present invention is to provide an apparatus and a method for judging and generating a warning with reference to the condition of the deceleration devices actuated for controlling the distance between two traveling vehicles.

An object of the present invention is to provide an apparatus and a method for performing the automatic distance control considering the presence of the warning.

An object of the present invention is to provide a recording medium for storing a computer program relating to the distance control method realized by the present invention.

To accomplish the above and other related objects, one aspect of the present invention provides a distance control apparatus and a related method for controlling a distance between two traveling vehicles. A plurality of deceleration devices, capable of acting as acceleration/deceleration means, are independently operable and different from each other in degree of attainable deceleration. An automatic distance control is performed by obtaining a control value required for controlling the distance between the two traveling vehicles based on a relationship between an actual value and a target value as well as a relative speed between the two traveling vehicles, and by actuating the acceleration/deceleration means based on the control value to control the distance between the two traveling vehicles. A warning operation is performed with reference to the deceleration devices actuated for the distance control. The warning is producible when the distance between the two traveling vehicles is shorter than a predetermined warning distance under the condition where the automatic distance control is in progress. At least one of the plurality of deceleration devices is selected to decelerate the succeeding vehicle. The warning operation is prohibited when a deceleration level attainable by the selected single or plural deceleration devices is lower than a predetermined maximum level even if the distance between the two traveling vehicles is shorter than the predetermined warning distance.

In other words, the present invention allows the activation of the warning device, only when the distance control apparatus is already using the available maximum deceleration obtained from the specific deceleration device or designated combination among the various deceleration devices which is capable of producing a predetermined maximum deceleration for the automatic distance control.

When the distance control apparatus has not used the available maximum deceleration, no warning is generated. Instead, the distance control apparatus activates the braking device so as to obtain the predetermined maximum deceleration for the automatic distance control.

When the braking device is already been used for decelerating the system's vehicle, the warning is generated. In response to the warning, the driver can depress the braking pedal strongly or abruptly with intent to immediately decelerate the vehicle.

It is preferable to judge that the deceleration level is higher than the predetermined maximum level when a deceleration device capable of generating a largest deceleration is already activated.

It is also preferable to judge that the deceleration level is higher than the predetermined maximum level when the control value for the automatic distance control is equivalent to an available maximum deceleration level.

Another aspect of the present invention provides a distance control apparatus and a related method for controlling a distance between two traveling vehicles characterized in that a deceleration control capable of obtaining an available maximum deceleration is performed in response to the warning operation.

In short, the warning operation and the automatic distance control are not independent from each other. Rather, the warning operation is closely correlated with the automatic distance control as an integrated vehicle behavior control system. It becomes possible to realize an optimized and cooperative operation of the automatic distance control and the warning generation so as to match with the driver's feeling.

Preferably, the deceleration control is performed by selecting a deceleration device capable of generating a largest deceleration.

Preferably, the deceleration control is performed by setting the control value to a value corresponding to the available maximum deceleration.

In practical automotive vehicles, the deceleration device capable of generating the largest deceleration is a braking device for applying a braking force to wheels of the succeeding vehicle.

In this case, the deceleration degree attainable by the driver's depression of the braking pedal (such as emergency braking) is fairly higher than the deceleration degree attainable by the automatic braking control performed in the automatic distance control. Thus, by forcibly applying the emergency braking, the driver can escape from the dangerous situation, such as a collision with the preceding vehicle. Otherwise, the driver may change the traveling lane by turning the steering wheel to avoid the collision. In this manner, the warning or alarm is generated only when it is truly necessary. The present invention thus realizes the effective warning generation by considering the condition of the automatic distance control.

Besides the braking device, an ordinary automotive vehicle has at least one additional deceleration device performing another function selected from the group consisting of a fuel cut control for partly or fully cutting fuel supplied to an internal combustion engine, an overdrive cut control for preventing a transmission from being shifted to an overdrive position, a shift down control for causing the transmission to shift to a lower position, an ignition timing control for retarding an ignition timing of the internal combustion engine, a lockup control for forcibly connecting input and output shafts of a torque converter, and an exhaust gas braking or retarder control for increasing a flow resistance in an exhaust passage of the internal combustion engine.

In the automatic distance control, the physical quantity to be controlled is usually a distance between two traveling vehicles. Thus, it is preferable that the actual value used in the automatic distance control represents an actual distance between the two traveling vehicles directly or indirectly while the target value represents a target distance between the two traveling vehicles directly or indirectly. In this case, the actual value may be a distance deviation between the actual distance and the target distance when the target value is the target distance.

Furthermore, it is preferable that the control value used in the automatic distance control is selected from the group consisting of a target acceleration, a target torque, and a target vehicle speed.

Another aspect of the present invention provides a recording medium storing a control program for controlling the distance between two traveling vehicles in accordance with the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained with reference to attached drawings.

First Embodiment

Figure 1:
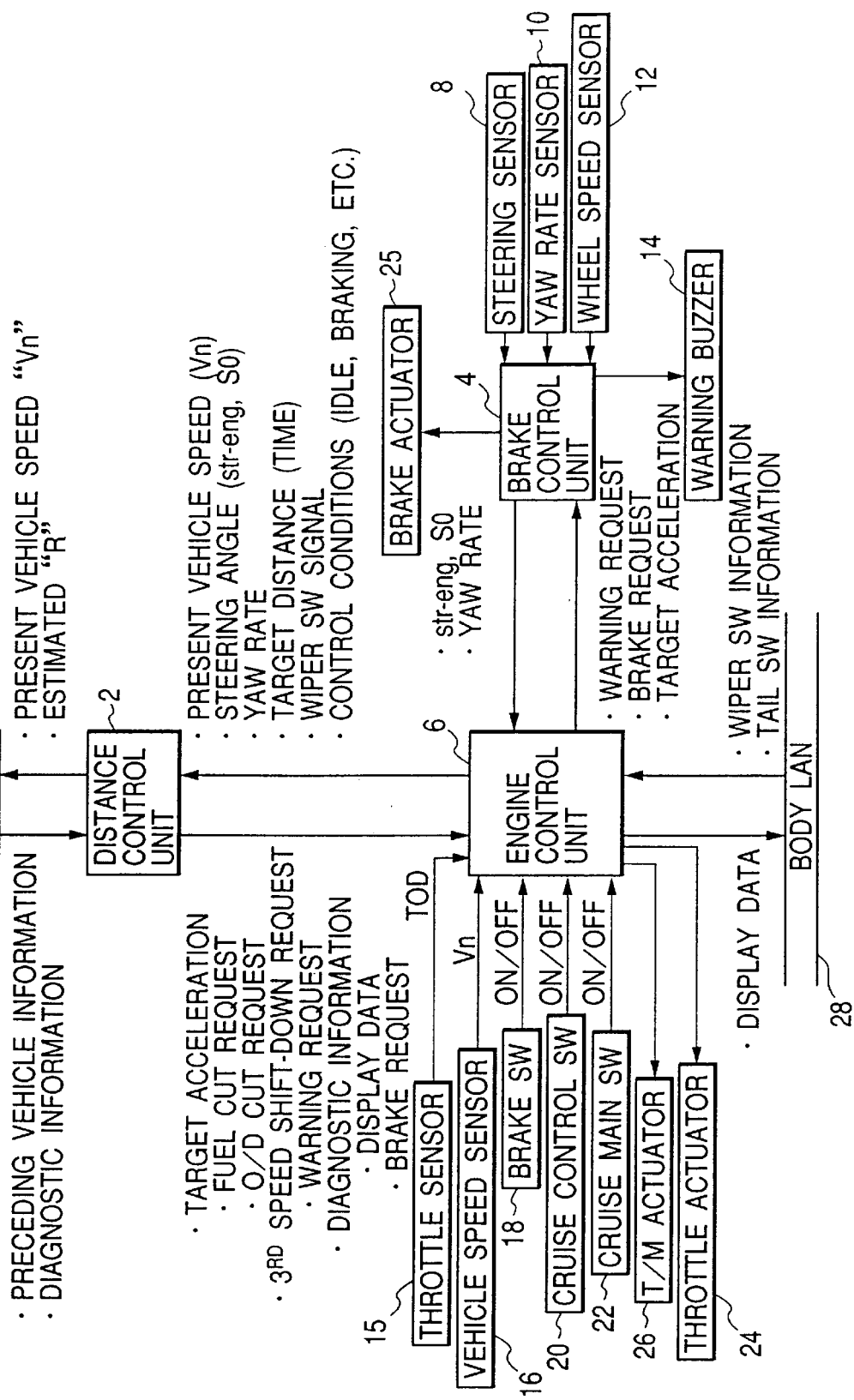
FIG. 1 is a block diagram showing a schematic system arrangement of a distance control apparatus for controlling the space between two traveling vehicles in accordance with of the present invention.

FIG. 1 shows an integrated control system of an automotive vehicle, comprising a distance control unit 2 for electronically controlling a space or distance between two traveling vehicles, a brake control unit 4 for electronically controlling the braking device for applying a braking force to wheels of the automotive vehicle, and an engine control unit 6 for controlling an internal combustion engine of the automotive vehicle.

The distance control unit 2 is an electronic circuit including a microcomputer connected to the engine control unit 6 and installed in an automotive vehicle (hereinafter referred to as a system's vehicle). The distance control unit 2 receives a present vehicle speed (Vn) signal, a steering angle (str-eng, S0) signal, a yaw rate signal, a target distance signal, a wiper switch signal, and various control signals, such as engine idling control and brake control signals, from the engine control unit 6. The distance control unit 2 estimates a curvature radius "R" of the road and calculates a distance or interval from the system's vehicle to a preceding vehicle.

A laser radar 3 is an electronic circuit including a laser distance scanner and a microcomputer. The laser distance scanner detects an angle of the preceding vehicle as well as a distance of the system's vehicle with respective to the preceding vehicle. The laser radar 3 functions as part of the distance control unit 2. For example, the laser radar 3 calculates the probability of both the preceding vehicle and the system's vehicle traveling on the same traffic lane or zone of the traveling road based on the present vehicle speed (Vn) signal and the estimated curvature radius "R" of the traveling road. The calculated result is sent as the preceding vehicle information to the distance control unit 2. The preceding vehicle information includes the detected distance and the relative speed between the system's vehicle and the preceding vehicle. Furthermore, the laser radar 3 performs diagnosis and sends a resultant diagnosis signal to the distance control unit 2.

The laser distance scanner irradiates a laser beam directed to the traveling direction of the system's vehicle as a transmission radio wave with a predetermined scanning angle and receives the laser beam reflected from a detected object. The laser distance scanner calculates the distance between the system's vehicle and the preceding vehicle in relation to the scanning angle.

The distance control unit 2 identifies a preceding vehicle to be recognized as an objective based on the preceding vehicle information received from the laser radar 3. The distance control unit 2 sends various control commands to the engine control unit 6 for adequately adjusting the distance or space between the system's vehicle and the preceding vehicle. The control commands, generated from the distance control unit 2, comprise a target acceleration signal, a fuel cut request signal, an O/D cut request signal, a third-speed shift down request signal, and a brake request signal. Furthermore, the distance control unit 2 performs the judgement for issuing a warning. A warning request signal or a warning cancel signal is sent to the engine control unit 6. A diagnosis signal and a display signal are also sent from the distance control unit 2 to the engine control unit 6.

The brake control unit 4 is an electronic circuit including a microcomputer associated with a steering sensor 8 detecting a steering angle of the system's vehicle, a yaw rate sensor 10 detecting a yaw rate of the system's vehicle, and a wheel speed sensor 12 detecting a rotational speed of each wheel. The brake control unit 4 sends the obtained data, such as the steering angle and the yaw rate of the system's vehicle, to the distance control unit 2 via the engine control unit 6. The brake control unit 4 receives the control commands, such as the target acceleration signal and the brake request signal, from the distance control unit 2 via the engine control unit 6 to control a brake actuator 25. The brake actuator 25 performs the duty control for opening and closing the pressurizing and depressurizing control valves equipped in a hydraulic braking pressure control circuit. Furthermore, The brake control unit 4 further receives the warning request signal from the distance control unit 2 via the engine control unit 6. The brake control unit 4 actuates a warning buzzer 14 in response to the warning request signal.

The engine control unit 6 is an electronic circuit including a microcomputer associated with a throttle opening sensor 15 detecting a throttle opening degree (TOD) of the internal combustion engine, a vehicle speed sensor 16 detecting a present vehicle speed (Vn), a brake switch 18 detecting the depression of a braking pedal, a cruise control switch 20, and a cruise main switch 22. The engine control unit 6 further receives various detecting signals obtained from other sensors and switches. A body LAN 28 is connected to the engine control unit 6 to transmit a wiper switch signal and a tail switch signal to the engine control unit 6. The engine control unit 6 is connected to the brake control unit 4 to receive the steering angle (str-eng, S0) signal and the yaw rate signal. The engine control unit 6 is connected to the distance control unit 2 to receive the target acceleration signal, the fuel cut request signal, the O/D cut request signal, the third-speed shift down request signal, the brake request signal, the warning request signal, the diagnosis signal, and the display data signal.

The engine control unit 6 controls a throttle actuator 24 and a transmission actuator 26 in accordance with the received signals representing the driving conditions. The throttle actuator 24 adjusts the throttle opening degree (TOD) of the internal combustion engine to control the output power of the internal combustion engine. The transmission actuator 26 performs the gear shift change as well as the lock-up control of the torque converter.

The transmission (not shown) is a five-speed automatic transmission with a fourth-speed stage of a reduction ratio=1 and a fifth-speed stage of a reduction ratio=0.7, which is generally referred to as a "4 speeds+overdrive (O/D)" transmission. In this case, the reduction ratio is defined by a ratio of the rotational speed of the gear to the output speed of the engine.

Accordingly, when the engine control unit 6 receives the O/D cut request signal from the distance control unit 2, the transmission actuator 26 causes the transmission to shift down from the fifth-speed stage to the fourth-speed stage in response to this O/D cut request signal. When the engine control unit 6 receives the third-speed shift down request signal from the distance control unit 2, the transmission actuator 26 causes the transmission to shift down from the fourth-speed stage to the third-speed stage in response to this third-speed shift down signal. In general, the shift-down operation of the transmission causes a large engine brake force. The system's vehicle decelerates in accordance with the generated braking force.

The engine control unit 6 transmits display information to a display unit (not show), such as an LCD located on an instrument panel or a dashboard in the passenger compartment, through the body LAN 28. Furthermore, the engine control unit 6 transmits the present vehicle speed (Vn) signal, the steering angle (str-eng, S0) signal, the yaw rate signal, the target distance signal, the wiper switch signal, and various control condition signals, such as engine idling signal and braking signal, to the distance control unit 2.

The detailed operation of the distance control unit 2 is explained with reference to flowcharts shown in FIGS. 2 to 11.

Figure 2:
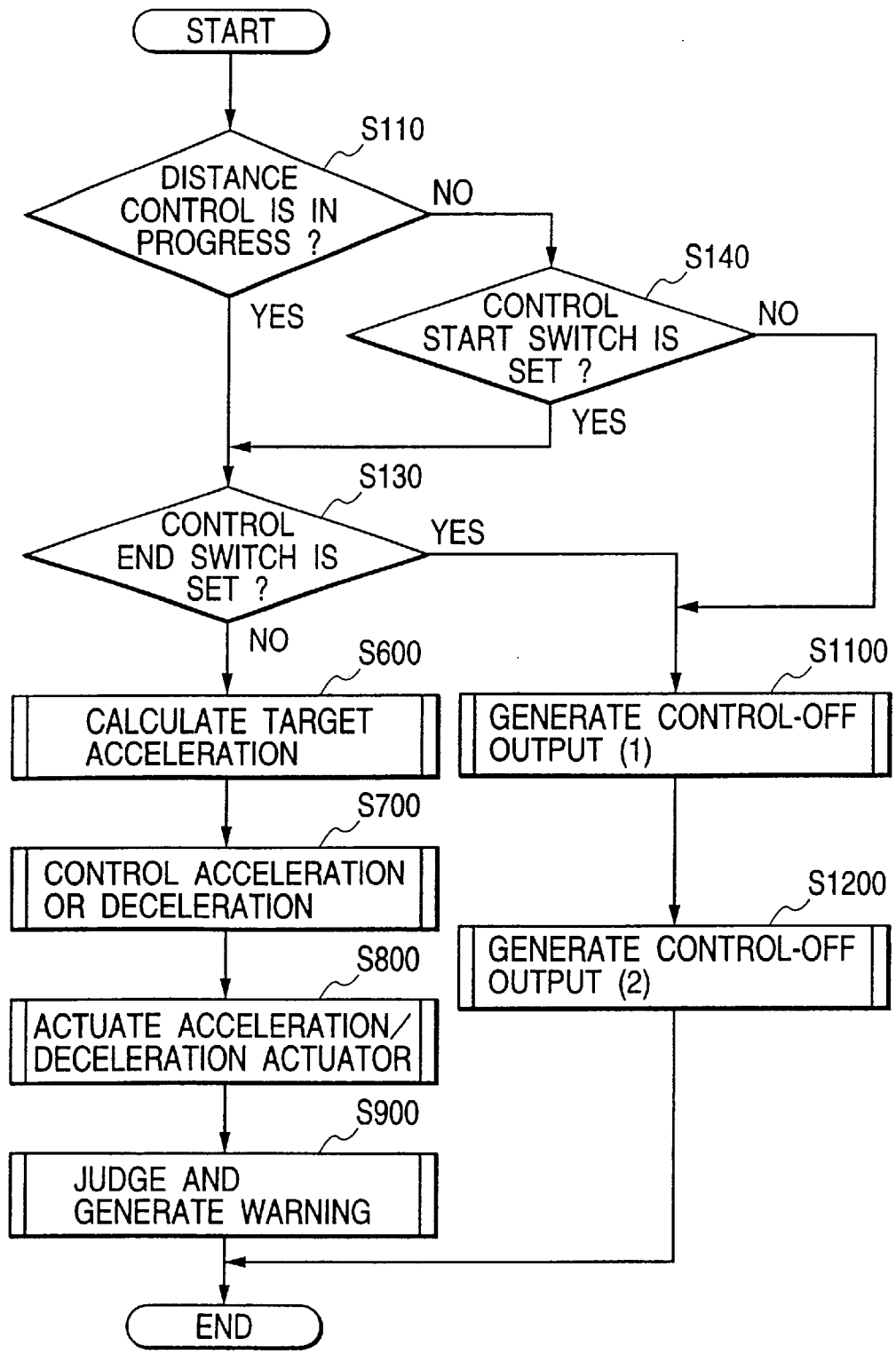
FIG. 2 is a flowchart showing a main processing procedure of the distance control apparatus in accordance with a first embodiment of the present invention.

FIG. 2 is a flowchart showing the main processing procedure performed in the distance control unit 2 in accordance with the first embodiment of the present invention. First, in step S110, it is checked whether the distance control is in progress or not. When the control is not started yet (NO in the step S110), it is checked in step S140 whether a control start switch is set or not. In this embodiment, the cruise control switch 20 functions as the control start switch. When the cruise control switch 20 is turned on, the judgement of the step 140 becomes YES. When the control start switch is not set yet (NO in the step S140), control-off output signals responsive to the deactivation of the acceleration/deceleration actuator are generated in step S1100. Then, control-off output signals responsive to the deactivation of the warning device are generated in step S1200. Then, the main processing procedure is terminated.

When the control start switch is already set (YES in the step S140), the control flow proceeds to step S130. Meanwhile, when the distance control is already started in the step S110, the control flow directly proceeds to the step S130.

In the step S130, it is checked whether a control end switch is set or not. In this embodiment, the cruise control switch 20 also functions as the control end switch. When the cruise control switch 20 is turned off, the judgement of the step 130 becomes YES. When the control end switch is already set (YES in the step S130), the control-off output signals are generated in the steps S1100 and S1200. Then, the main processing procedure is terminated.

When the control end switch is not set yet (NO in the step S130), the control flow proceeds to sequential steps of S600 (a subroutine for calculating a target acceleration), S700 (a subroutine for controlling the acceleration and deceleration), S800 (a subroutine for actuating the acceleration/deceleration apparatus), and S900 (a subroutine for judging and issuing a warning or an alarm). Then, the main processing procedure is terminated.

Figures 3A, 3B:
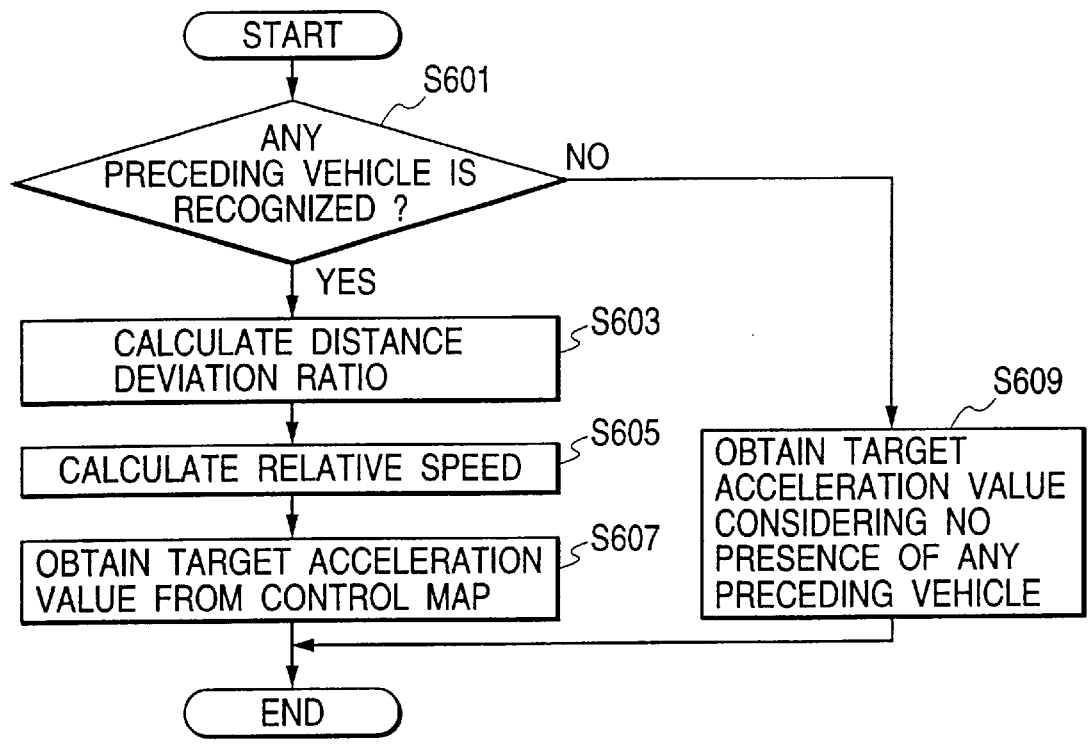
FIG. 3A is a flowchart showing a target acceleration calculating subroutine constituting part of the main processing procedure of the distance control apparatus in accordance with the first embodiment of the present invention.
FIG. 3B is a control map used in the target acceleration calculating subroutine.

FIG. 3A is a flowchart showing the details of the step S600 which is the subroutine for calculating the target acceleration (or deceleration).

In the step S601, it is checked whether any preceding vehicle is recognized or not. When no preceding vehicle is recognized (NO in the step S601), a target acceleration value is obtained considering no presence of any preceding vehicle in step S609. Then, this subroutine is completed. When any preceding vehicle is recognized (YES in the step S601), the control flow proceeds to step S603 to calculate a distance deviation ratio γ.

The distance deviation ratio γ is defined by a ratio of a distance deviation Δd(=d−dm) to the target distance dm, when "d" represents an actual distance between the preceding vehicle and the system's vehicle and "dm" represents the target distance between the vehicles.

$$\gamma = \frac{\Delta d}{dm} = \frac{(d-dm)}{dm}(\%)$$

The target distance "dm" is adjustable in accordance with the vehicle speed, so that an appropriate distance matching with each driver's feeling is maintained between two traveling vehicles.

Then, in the next step S605, a relative speed ΔV is calculated based on a distance variation between two traveling vehicles which is recognized by the laser radar 3. The laser radar 3 has the capability of calculating the relative speed ΔV based on the detected distance variation, so that the calculated relative speed value is sent to the distance control unit 2. Otherwise, the distance control unit 2 can obtain the relative speed ΔV based on the distance information sent from the laser radar 3.

The processing order of the successively performed steps S603 and S605 can be reversed if required.

Then, in the next step S607, a target acceleration value is obtained based on the obtained distance deviation ratio γ (step S603) and the obtained relative speed ΔV (step S605) with reference to a control map shown in FIG. 3B. The control map of FIG. 3B shows a total of eight discrete reference values representing the distance deviation ratio γ, i.e., −96, −80, −64, −48, −32, −16, 0, 16, as well as a total of six discrete reference values representing the relative speed ΔV, i.e., 16, 8, 0, −8, −16, −24. Map data are given in relation to these different values. When the obtained distance deviation ratio γ and/or the obtained relative speed ΔV are somewhere between two discrete values, the map data are linearly interpolated to obtain an appropriate control value. When the obtained distance deviation ratio γ or the obtained relative speed ΔV is beyond the designated region of the control map shown in FIG. 3B, the control value is obtained based on the most-closest discrete value (i.e., a value located at the corresponding edge of the control map). It is possible to apply a predetermined upper and/or lower limit guard in the adoption of the map data. Then, this subroutine is completed.

Figure 4:
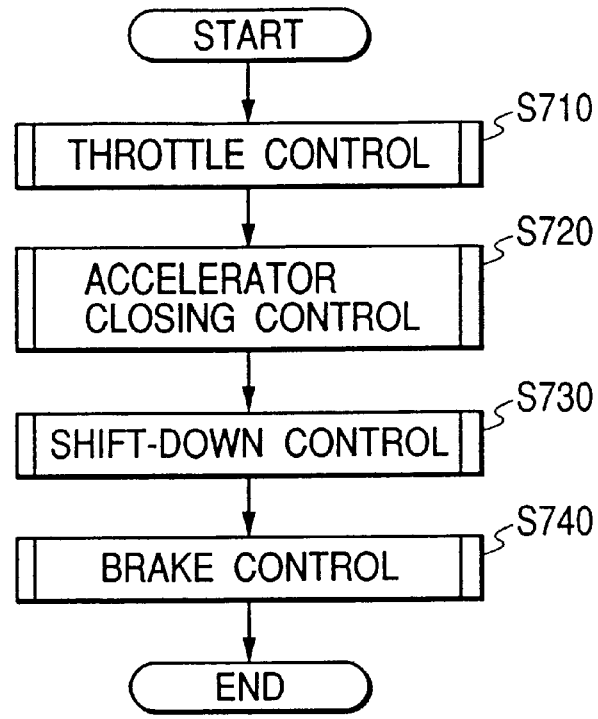
FIG. 4 is a flowchart showing an acceleration/deceleration control subroutine constituting part of the main processing procedure of the distance control apparatus shown in FIG. 2.

FIG. 4 is a flowchart showing the details of the step S700 which is the subroutine for obtaining the target acceleration. This subroutine comprises a throttle control (step S710), an accelerator closing control (step S720), a shift-down control (step S730), and a brake control (step S740) which are sequentially performed.

Figure 5:
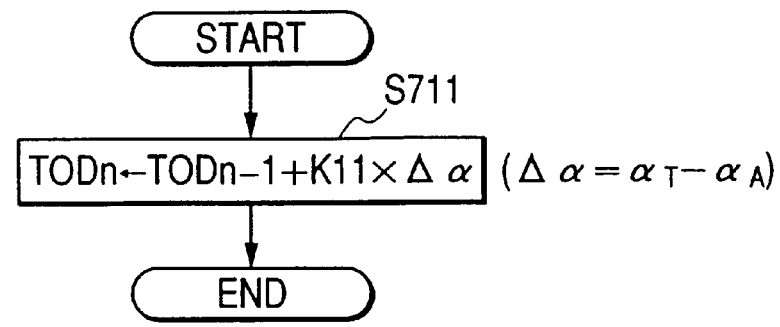
FIG. 5 is a flowchart showing details of a throttle control performed in the acceleration/deceleration control subroutine shown in FIG. 4.

FIG. 5 is a flowchart showing the details of the throttle control of the step S710. More specifically, in step S711, a present throttle opening degree TODn is obtained by multiplying a throttle control gain K11 with an acceleration deviation Δα and adding the obtained multiplied value K11×Δα to a previous throttle opening degree TODn-1.

$$TODn \leftarrow TODn\text{-}1 + K11 \times \Delta\alpha$$

$$\Delta\alpha = \alpha_T - \alpha_A$$

where $\alpha_T$ represents the target acceleration and $\alpha_A$ represents an actual acceleration.

Figure 6:
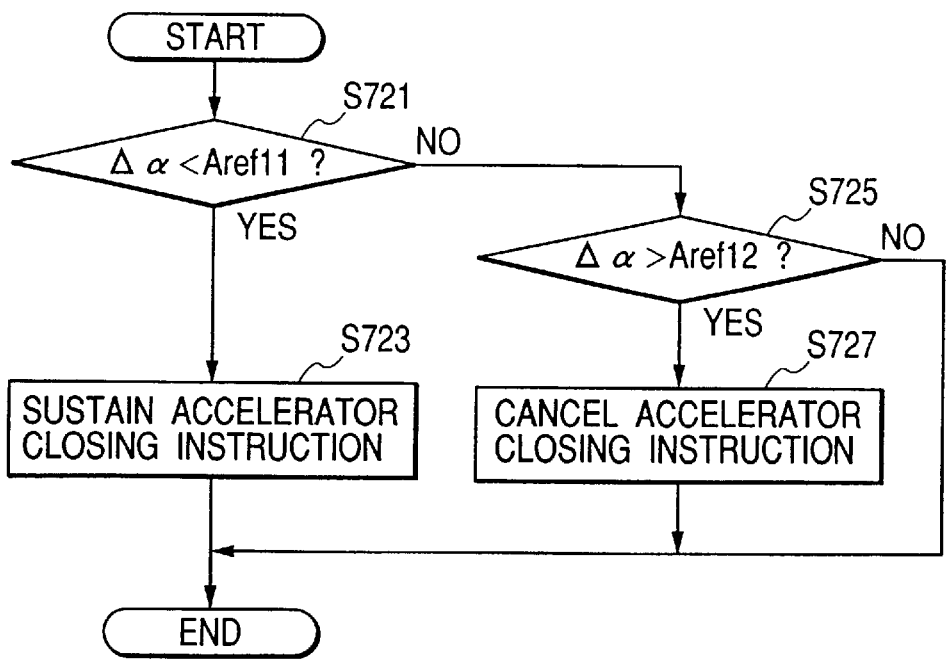
FIG. 6 is a flowchart showing details of an accelerator closing control performed in the acceleration/deceleration control subroutine shown in FIG. 4.

FIG. 6 is a flowchart showing the details of the accelerator closing control of the step S720. More specifically, in step S721, it is checked whether the acceleration deviation Δα is smaller than a first reference value Aref11 or not. When the judgement result is YES in the step S721(i.e., Δα<Aref11), the control flow proceeds to step S723 to sustain an accelerator closing instruction. Then, this subroutine is terminated.

When the judgement result is NO in the step S721 (i.e., Δα≧Aref11), the control flow proceeds to step S725 to further check whether the acceleration deviation Δα is larger than a second reference value Aref12 or not. The second reference value Aref12 is larger than the first reference value Aref11 (i.e., Aref12>Aref11). When the judgement result is YES in the step S725 (i.e., Δα>Aref12), the control flow proceeds to step S727 to cancel the accelerator closing instruction. Then, this subroutine is terminated. When the judgement result is NO in the step S725 (i.e., Δα≦Aref12), this subroutine is terminated.

Figure 7:
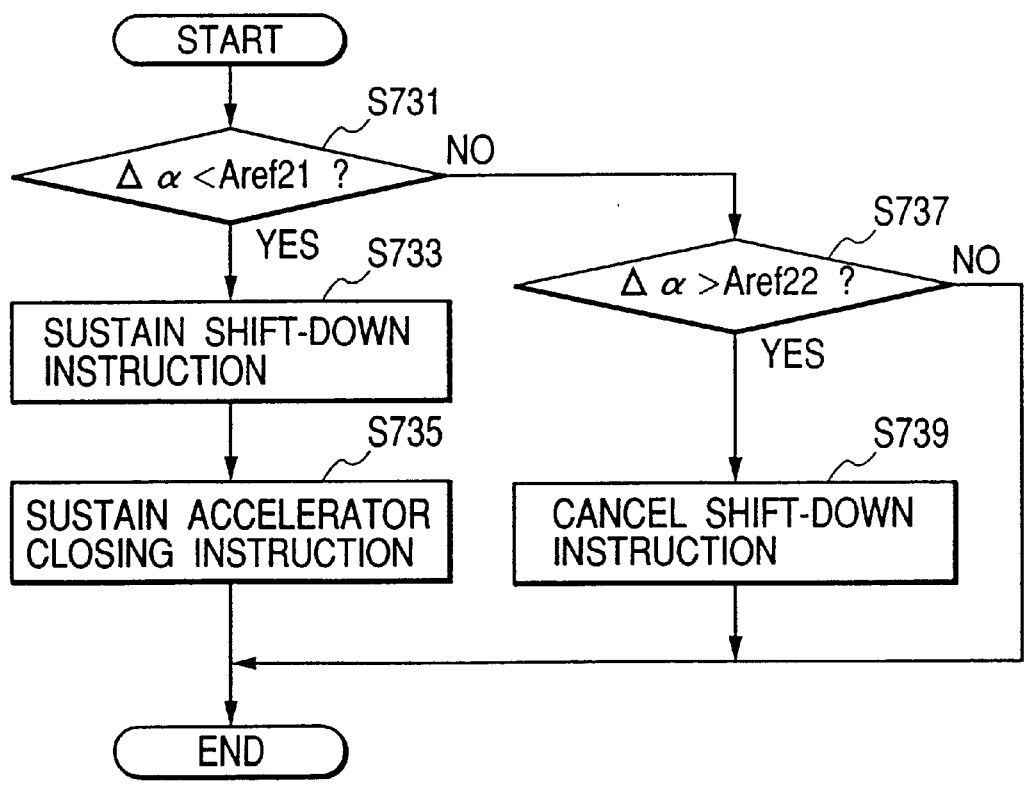
FIG. 7 is a flowchart showing details of a shift-down control performed in the acceleration/deceleration control subroutine shown in FIG. 4.

FIG. 7 is a flowchart showing the details of the shift-down control of the step S730. More specifically, in step S731, it is checked whether the acceleration deviation Δα is smaller than a third reference value Aref21 or not. When the judgement result is YES in the step S731(i.e., Δα<Aref21), the control flow proceeds to step S733 to sustain a shift-down instruction. Then, in the next step S735, the accelerator closing instruction is sustained. Then, this subroutine is terminated.

When the judgement result is NO in the step S731(i.e., $\Delta\alpha \geq \text{Aref21}$), the control flow proceeds to step S737 to further check whether the acceleration deviation $\Delta\alpha$ is larger than a fourth reference value Aref22 or not. The fourth reference value Aref22 is larger than the third reference value Aref21 (i.e., Aref22>Aref21). When the judgement result is YES in the step S737(i.e., $\Delta\alpha>\text{Aref22}$), the control flow proceeds to step S739 to cancel the shift-down instruction. Then, this subroutine is terminated. When the judgement result is NO in the step S737(i.e., $\Delta\alpha \leq \text{Aref22}$), this subroutine is terminated.

Figure 8:
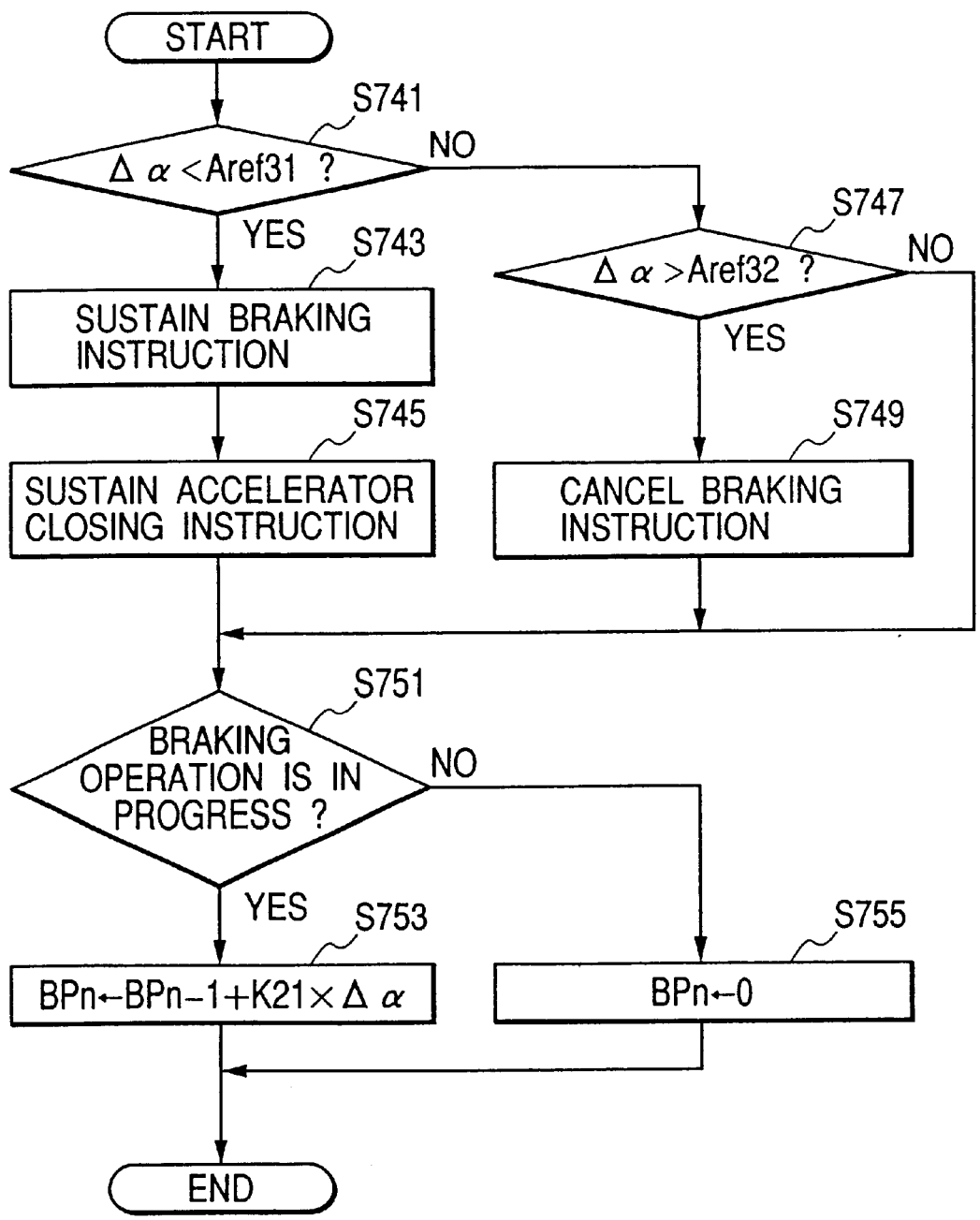
FIG. 8 is a flowchart showing details of a brake control performed in the acceleration/deceleration control subroutine shown in FIG. 4.

FIG. 8 is a flowchart showing the details of the brake control of the step S740. More specifically, in step S741, it is checked whether the acceleration deviation $\Delta\alpha$ is smaller than a fifth reference value Aref31 or not. When the judgement result is YES in the step S741(i.e., $\Delta\alpha<\text{Aref31}$), the control flow proceeds to step S743 to sustain a braking instruction. Then, in the next step S745, the accelerator closing instruction is sustained. Then, the control flow proceeds to step S751.

When the judgement result is NO in the step S741(i.e., $\Delta\alpha \geq \text{Aref31}$), the control flow proceeds to step S747 to further check whether the acceleration deviation $\Delta\alpha$ is larger than a sixth reference value Aref32 or not. The sixth reference value Aref32 is larger than the fifth reference value Aref31 (i.e., Aref32>Aref31). When the judgement result is YES in the step S747(i.e., $\Delta\alpha>\text{Aref32}$), the control flow proceeds to step S749 to cancel the braking instruction. Then, the control flow proceeds to the step S751. When the judgement result is NO in the step S747(i.e., $\Delta\alpha \leq \text{Aref32}$), the control flow directly proceeds to the step S751.

In the step S751, it is checked whether the braking instruction is sustained or not. When the judgement result is YES in the step S751, the control flow proceeds to step S753 to obtain a present braking pressure value. The present braking pressure BPn is obtained by multiplying a throttle control gain K21 with the acceleration deviation $\Delta\alpha$ and adding the obtained multiplied value K21×$\Delta\alpha$ to a previous braking pressure BPn-1.

$$BPn \leftarrow BPn\text{-}1 + K21 \times \Delta\alpha$$

When the judgement result is NO in the step S751, the control flow proceeds to step S755 to equalize the present braking pressure to 0, i.e., BPn=0. After finishing the steps S753 or S755, this subroutine is completed.

In general, it is essentially important to ensure safety or careful driving during the automatic distance control or any other automatic vehicle behavior control. In view of this, the maximum deceleration obtainable during the automatic braking control is limited within a predetermined allowable value so as not to endanger the passengers by sudden or abrupt braking resulting from the excessively large deceleration value.

In other words, the driver can cause more large deceleration by strongly or fully depressing the braking pedal with his or her intent to immediately decelerate the vehicle. The deceleration degree attainable by the driver's depression of the braking pedal (such as emergency braking) is fairly higher than the deceleration degree attainable by the automatic braking control performed in the automatic distance control.

Figure 9:
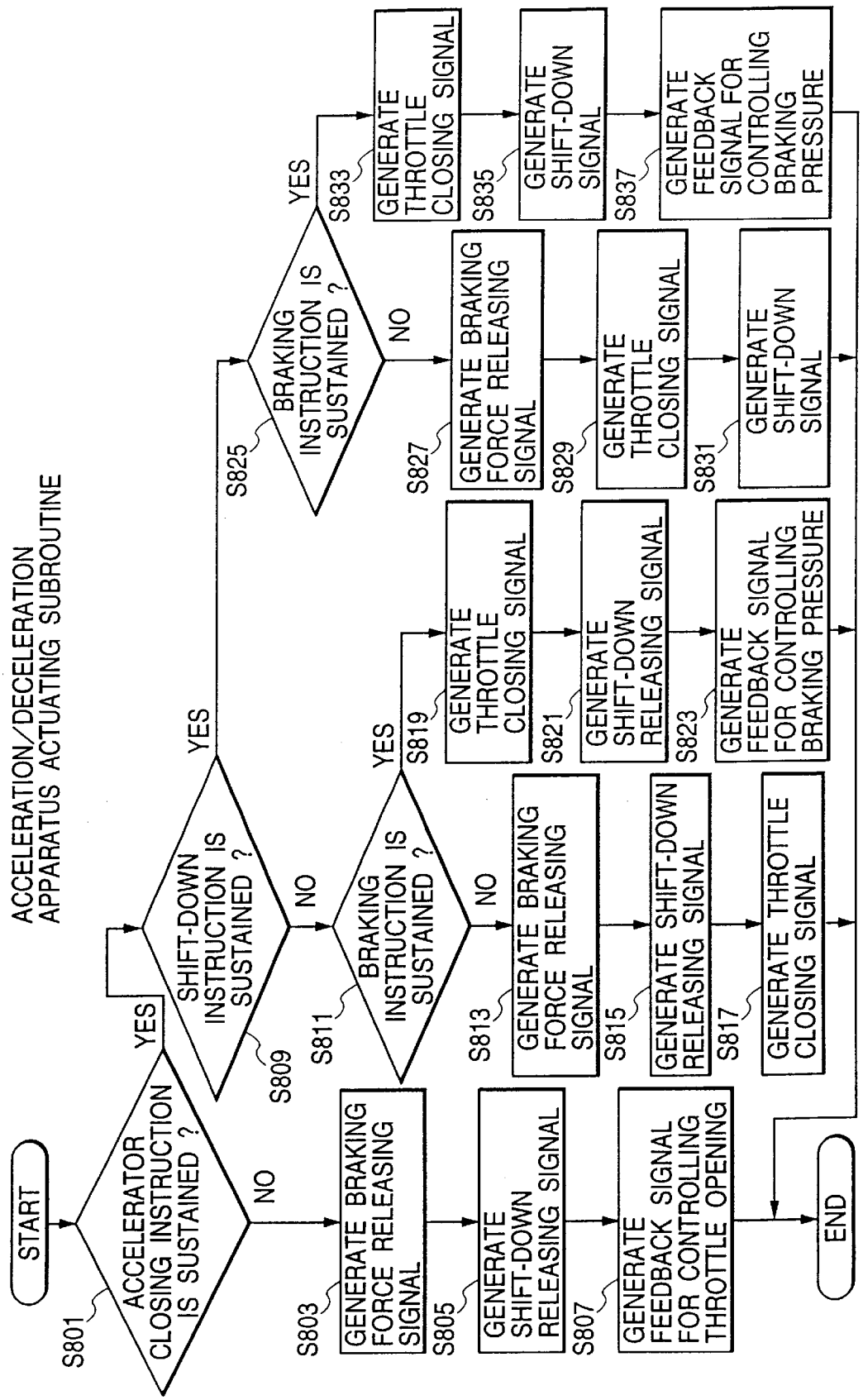
FIG. 9 is a flowchart showing an acceleration/deceleration actuator control subroutine constituting part of the main processing procedure of the automatic distance control shown in FIG. 2.

FIG. 9 is a flowchart showing the details of the step S800 which is the subroutine for actuating the acceleration/deceleration actuator.

In step S801, it is checked whether the accelerator closing instruction is sustained or not. When the accelerator closing instruction is canceled (i.e., NO in the step S801), the control flow proceeds to steps S803, S805 and S807 which are sequentially performed. In the step S803, a braking force releasing signal is generated. In the step S805, a shift-down releasing signal is generated. In the step S807, a feedback signal for controlling a throttle opening is generated. Then, this subroutine is terminated.

Meanwhile, when the accelerator closing instruction is sustained (i.e., YES in the step S801), the control flow proceeds to step S809 to further check whether the shift-down instruction is sustained or not. When the shift-down instruction is canceled (i.e., NO in the step S809), the control flow proceeds to step 811 to further check whether the braking instruction is sustained or not. When the braking instruction is canceled (i.e., NO in the step S811), the control flow proceeds to steps S813, S815 and S817 which are sequentially performed. In the step S813, the braking force releasing signal is generated. In the step S815, the shift-down releasing signal is generated. In the step S817, a throttle closing signal is generated to completely close the throttle valve. Then, this subroutine is terminated.

When the braking instruction is sustained (i.e., YES in the step S811), the control flow proceeds to steps S819, S821 and S823 which are sequentially performed. In the step S819, the throttle closing signal is generated to completely close the throttle valve. In the step S821, the shift-down releasing signal is generated. In the step S823, a feedback signal for controlling the braking pressure is generated. Then, this subroutine is terminated.

Meanwhile, when the shift-down instruction is sustained (i.e., YES in the step S809), the control flow proceeds to step 825 to further check whether the braking instruction is sustained or not. When the braking instruction is canceled (i.e., NO in the step S825), the control flow proceeds to steps S827, S829 and S831 which are sequentially performed. In the step S827, the braking force releasing signal is generated. In the step S829, the throttle closing signal is generated to completely close the throttle valve. In the step S831, the shift-down signal is generated to actuate the transmission actuator to realize a designated shift-down operation. Then, this subroutine is terminated.

When the braking instruction is sustained (i.e., YES in the step S825), the control flow proceeds to steps S833, S835 and S837. In the step S833, the throttle closing signal is generated to completely close the throttle valve. In the step S835, the shift-down signal is generated to actuate the transmission actuator to realize the designated shift-down operation. In the step S837, the feedback signal for controlling the braking pressure is generated. Then, this subroutine is terminated.

Figure 10:
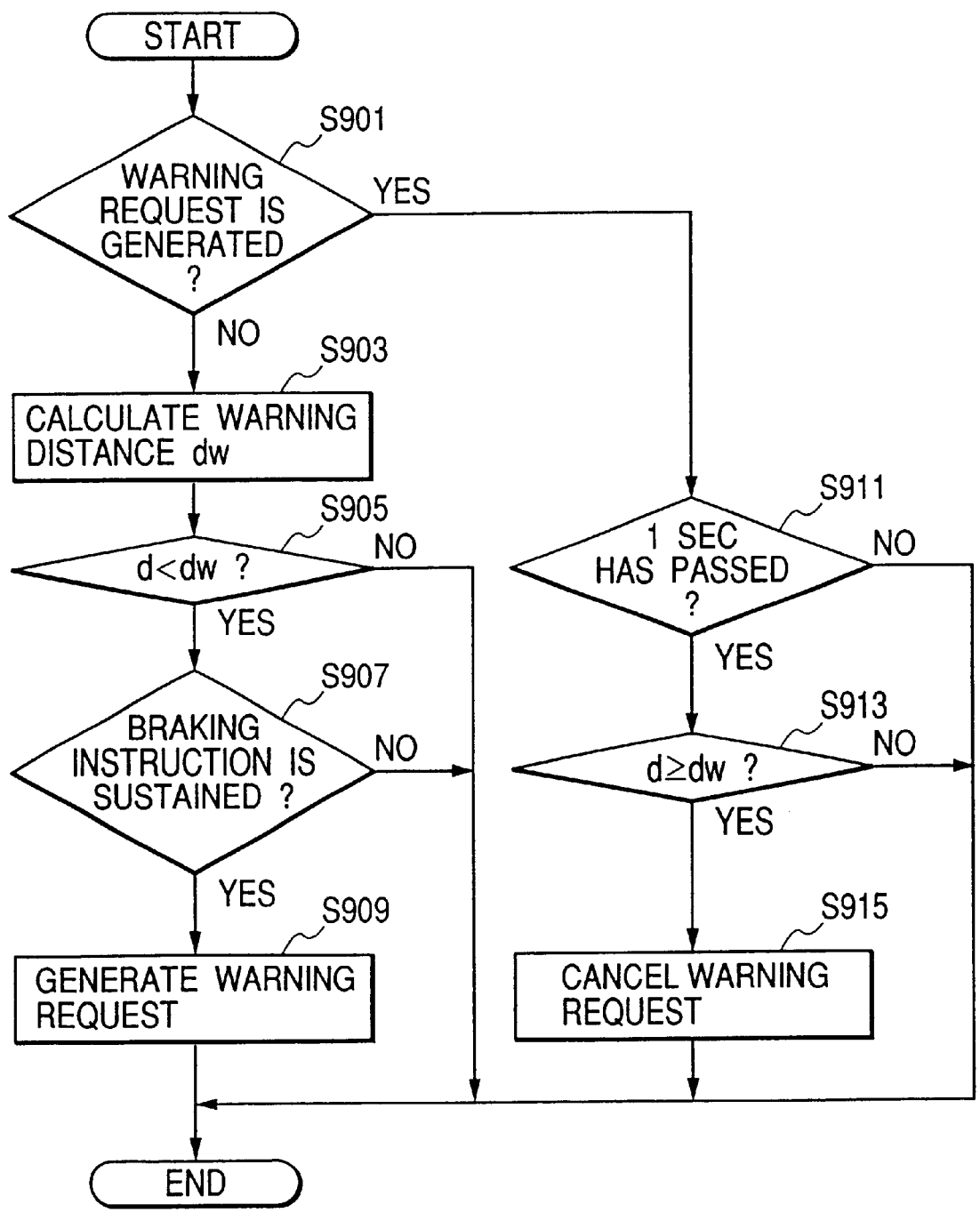
FIG. 10 is a flowchart showing a warning judgement and generating subroutine constituting part of the main processing procedure of the automatic distance control shown in FIG. 2.

FIG. 10 is a flowchart showing the details of the step S900 which is the subroutine for judging and generating a warning (or an alarm).

In step S901, it is checked whether a warning request is generated or not. When no warning request is generated (i.e., NO in the step S901), a warning distance dw is calculated in step S903. The warning distance dw is expressed by the function of the vehicle speed Vn and the relative speed $\Delta V$.

$$dw = f(Vn, \Delta V)$$

Then, in a next step S905, it is checked whether the actual distance "d" is shorter than the calculated warning distance "dw" or not. When the actual distance "d" is not shorter than the warning distance "dw" (i.e., NO in the step S905), this subroutine is terminated.

When the actual distance "d" is shorter than the warning distance "dw" (YES in the step S905), it is further checked in a next step S907 whether the braking instruction is sustained or not with reference to the step S743 of the brake control subroutine shown in FIG. 8. When the braking instruction is sustained (i.e., YES in the step S907), a warning request is generated in step S909. The warning request is sent from the engine control unit 6 to the brake control unit 4. The brake control unit 4 activates the warning buzzer 14 in response to the warning request.

Furthermore, when the braking instruction is not sustained (i.e., NO in the step S907), this subroutine is terminated. More specifically, even when the actual distance "d" is shorter than the warning distance "dw", no warning or alarm is generated unless the braking instruction is sustained. The brake request signal is one of the deceleration commands. Besides the brake request signal, the fuel cut request signal, the O/D cut request signal, and the third-speed shift down request signal are deceleration commands.

Among various deceleration commands generated from the distance control command 2, the brake request signal brings the largest deceleration.

In other words, it is assumed that the deceleration obtained by applying the braking force is in an available maximum level in the automatic distance control.
Accordingly, the warning is issued only when the actual distance "d" is shorter than the warning distance "dw" under the condition where the braking instruction is sustained.

On the other hand, when the warning request is being generated (i.e., YES in the step S901), it is further checked in step S911 whether one second has passed after issuance of the warning request. When one second has not passed yet (i.e., NO in the step S911), this subroutine is terminated. In other words, the warning generating operation continues at least one second.

When one second has passed (i.e., YES in the step S911), it is then checked in step S913 whether the actual distance "d" is equal to or longer than the warning distance "dw". When the actual distance "d" is still shorter than the warning distance "dw" (i.e., NO in the step S913), this subroutine is terminated. The warning request is sustained. When the actual distance "d" is equal to or longer than the warning distance "dw" (i.e., YES in the step S913), the warning request is canceled in step S915. The cancellation of the warning request is transmitted from the engine control unit 6 to the brake control unit 4. The brake control unit 4 deactivates the warning buzzer 14 in response to the cancellation of the warning request.

Figure 11:
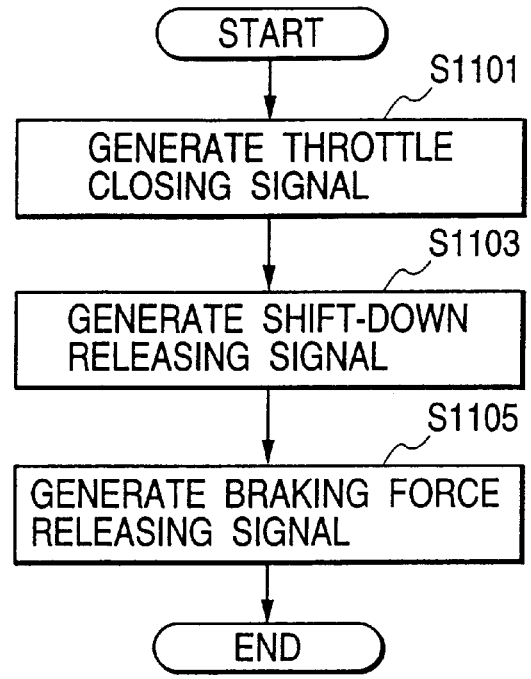
FIG. 11 is a flowchart showing a control-off output generating subroutine shown in FIG. 2 which is responsive to the deactivation of the acceleration/deceleration actuator.

FIG. 11 is a flowchart showing the details of the step S1100 which is the subroutine for generating the control-off output signals responsive to the deactivation of the acceleration/deceleration actuator. This subroutine shows a processing procedure executed when the acceleration/deceleration actuator receives no instructions for the acceleration and/or deceleration. In step S1101, the throttle closing signal is generated to completely close the throttle valve. Then, in step S1103, the shift-down releasing signal is generated. Subsequently, in step S1105, the braking force releasing signal is generated. Then, this subroutine is terminated.

Figure 12:
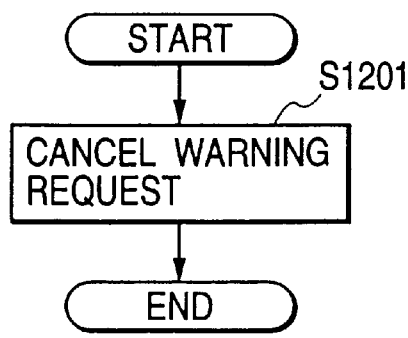
FIG. 12 is a flowchart showing another control-off output generating subroutine shown in FIG. 2 which is responsive to the deactivation of the warning device.

FIG. 12 is a flowchart showing the details of the step S1200 which is the subroutine for generating the control-off output signal responsive to the deactivation of the warning device. In step S1201, a warning request is canceled.

As apparent from the foregoing description, the present invention generates the warning request (step S909) only when the braking instruction is sustained (YES in the step S907) under the condition the actual distance becomes shorter than the warning distance (i.e., YES in the step S905). In other words, the present invention allows the activation of the warning device, such as the warning buzzer 14, only when the distance control apparatus is already using the available maximum deceleration obtained from the specific deceleration device (i.e., the braking device in this embodiment) which is capable of producing the maximum deceleration for the automatic distance control among the various deceleration devices.

When the distance control apparatus has not used the available maximum deceleration, no warning is generated. Instead, the distance control apparatus activates the braking device so as to obtain the available maximum deceleration for the automatic distance control.

When the braking device is already been used for decelerating the system's vehicle, the warning is generated. In response to the warning, the driver can depress the braking pedal strongly or abruptly with intent to immediately decelerate the vehicle. As explained above, the deceleration degree attainable by the driver's depression of the braking pedal (such as emergency braking) is fairly higher than the deceleration degree attainable by the automatic braking control performed in the distance control. Thus, by forcibly applying the emergency braking, the driver can escape from the dangerous situation, such as a collision with the preceding vehicle. Otherwise, it is possible for the driver to change the traveling lane by turning the steering wheel to avoid the collision. In this manner, the warning or alarm is generated only when it is truly necessary. The present invention thus realizes the effective warning generation. In short, the first embodiment of the present invention is characterized in that the warning operation is performed by considering the condition of the automatic distance control.

Second Embodiment

Figure 13:
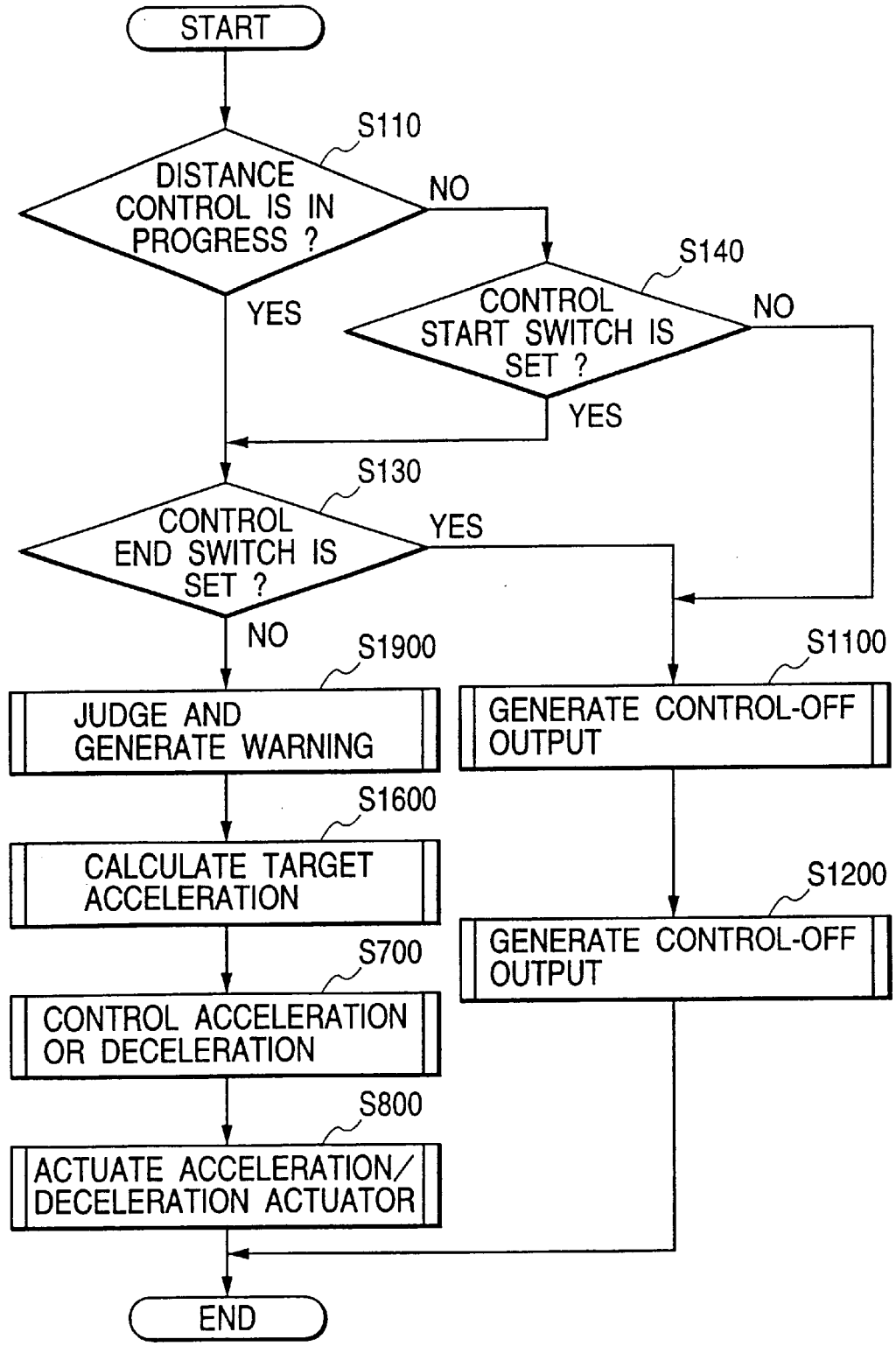
FIG. 13 is a flowchart showing a main processing procedure of the distance control apparatus in accordance with a second embodiment of the present invention.
Figure 14:
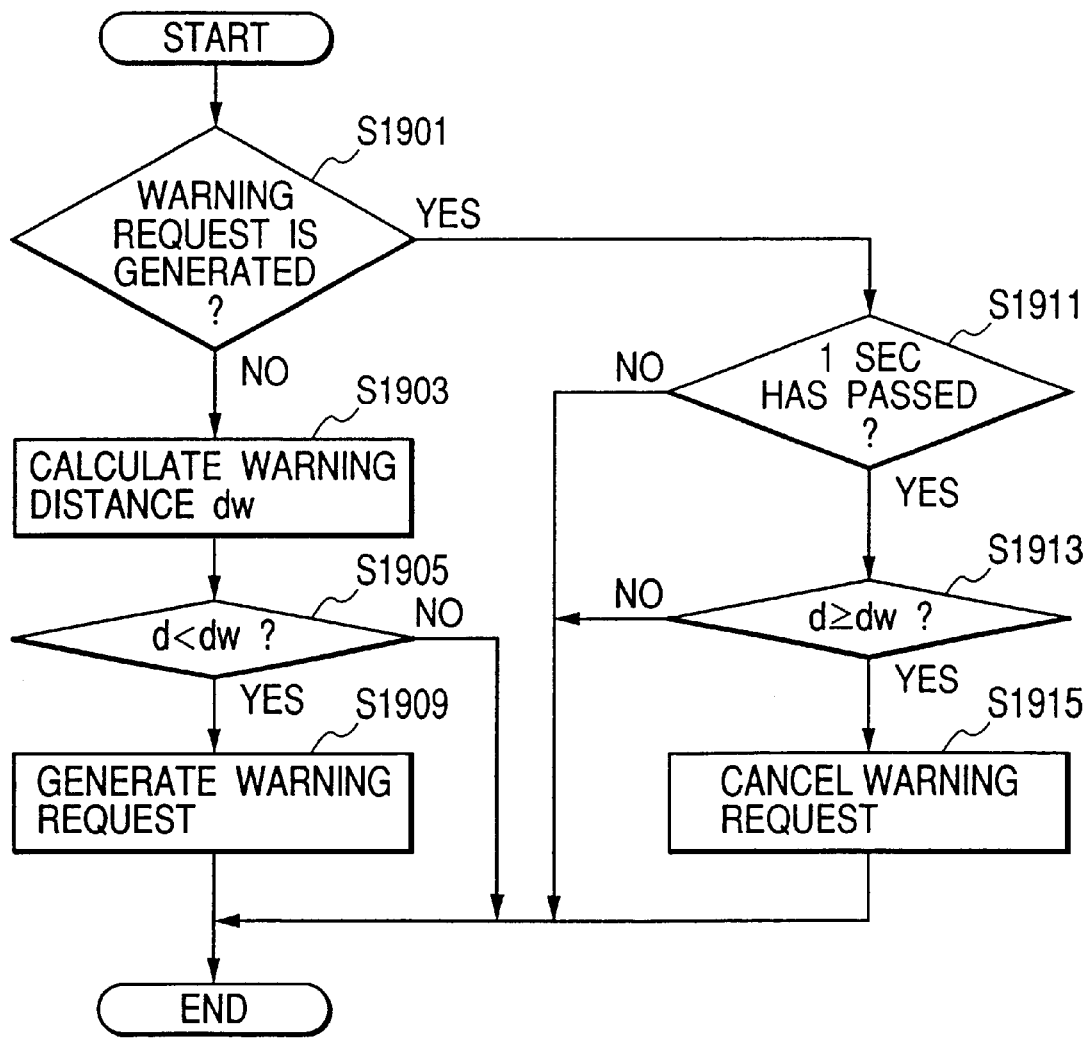
FIG. 14 is a flowchart showing a warning judgement and generating subroutine constituting part of the main processing procedure of the distance control apparatus shown in FIG. 13.
Figure 15:
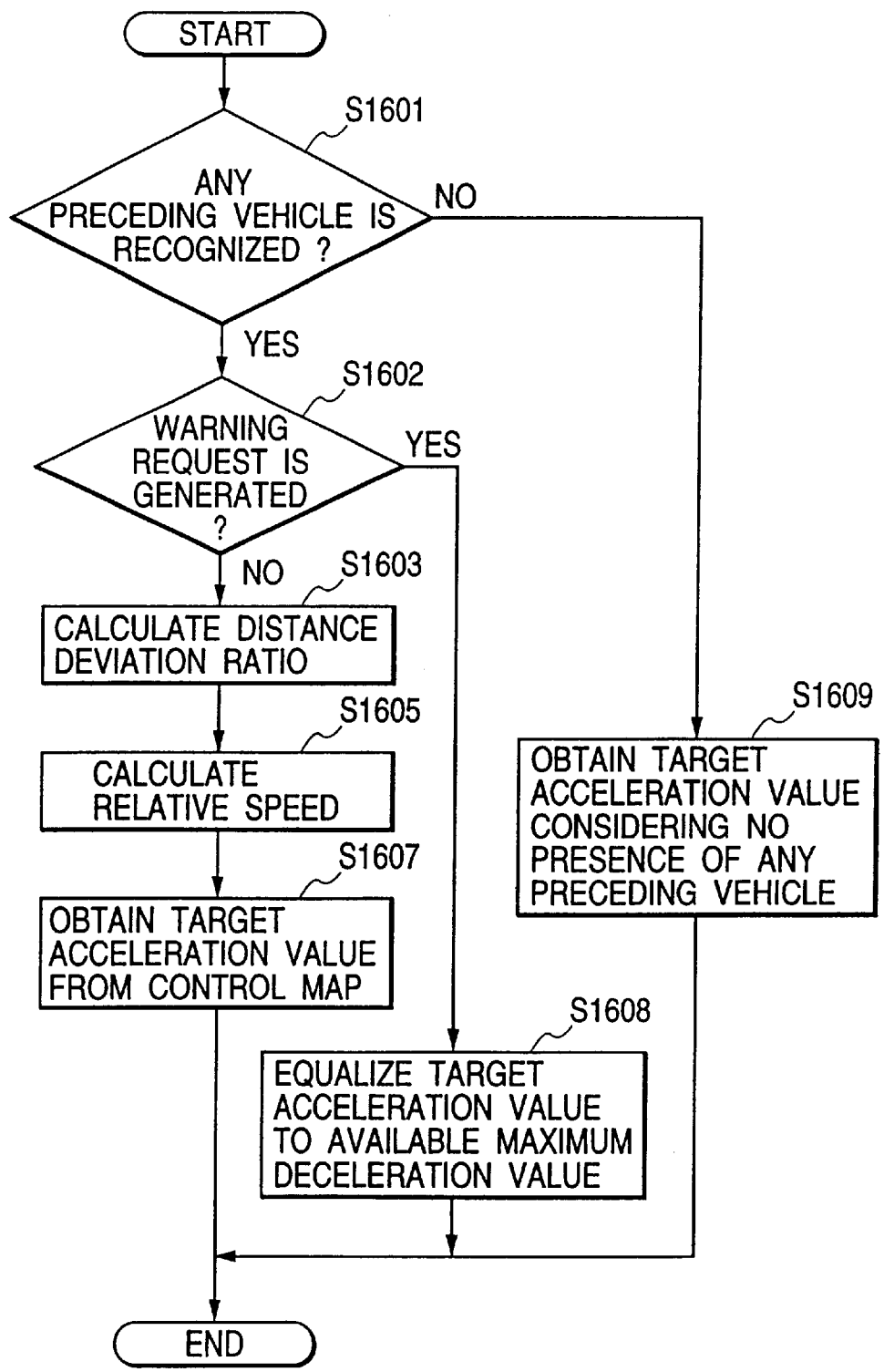
FIG. 15 is a flowchart showing a target acceleration calculating subroutine constituting part of the main processing procedure of the distance control apparatus shown in FIG. 13.

The second embodiment of the present invention, explained with reference to FIGS. 13 to 15, is characterized in that the automatic distance control is performed by considering the condition of the warning operation.

The integrated control system of an automotive vehicle, shown in FIG. 1, is also used in the second embodiment.

FIG. 13 is a flowchart showing the main processing procedure performed in the distance control unit 2 in accordance with the second embodiment of the present invention. Steps S110, S130, S140, S700, S800, S1100 and S1200 are identical with those of FIG. 2 explained in the first embodiment. Namely, in the step S110, it is checked whether the distance control is in progress or not. When the control is not started yet (NO in the step S110), it is checked in the step S140 whether the control start switch is set or not. When the control start switch is not set yet (NO in the step S140), the control-off output signals responsive to the deactivation of the acceleration/deceleration actuator are generated in the step S1100. Then, the control-off output signals responsive to the deactivation of the warning device are generated in the step S1200. Then, the main processing procedure is terminated.

When the control start switch is already set (YES in the step S140), the control flow proceeds to the step S130. Meanwhile, when the distance control is already started in the step S110, the control flow directly proceeds to the step S130.

In the step S130, it is checked whether the control end switch is set or not. When the control end switch is already set (YES in the step S130), the control-off output signal is generated in the steps S1100 and S1200. Then, the main processing procedure is terminated.

When the control end switch is not set yet (NO in the step S130), the control flow proceeds to the steps of S1900 (a subroutine for judging and generating a warning or an alarm), S1600 (a subroutine for calculating a target acceleration), S700 (the subroutine for controlling the acceleration and deceleration) and S800 (the subroutine for actuating the acceleration/deceleration actuator) which are sequentially performed in this order. Then, the main processing procedure is terminated.

FIG. 14 is a flowchart showing the details of the step S1900 which is the subroutine for judging and issuing a warning (or an alarm).

In step S1901, it is checked whether a warning request is generated or not. When no warning request is generated (i.e., NO in the step S1901), the warning distance dw is calculated in step S1903. The warning distance dw is expressed by the function of the vehicle speed Vn and the relative speed ΔV.

$$dw = f(Vn, \Delta V)$$

Then, in the next step S1905, it is checked whether the actual distance "d" is shorter than the calculated warning distance "dw" or not. When the actual distance "d" is not shorter than the warning distance "dw" (i.e., NO in the step S1905), this subroutine is terminated.

When the actual distance "d" is shorter than the warning distance "dw" (YES in the step S1905), a warning request is generated in step S1909. The warning request is sent from the engine control unit 6 to the brake control unit 4. The brake control unit 4 activates the warning buzzer 14 in response to the warning request.

On the other hand, when the warning request is being generated (i.e., YES in the step S1901), it is further checked in step S1911 whether one second has passed after issuance of the warning request. When one second has not passed yet (i.e., NO in the step S1911), this subroutine is terminated. In other words, the warning generating operation continues at least one second.

When one second has passed (i.e., YES in the step S1911), it is then checked in step S1913 whether the actual distance "d" is equal to or longer than the warning distance "dw". When the actual distance "d" is still shorter than the warning distance "dw" (i.e., NO in the step S1913), this subroutine is terminated. The warning request is sustained. When the actual distance "d" is equal to or longer than the warning distance "dw" (i.e., YES in the step S1913), the warning request is canceled in step S1915. The cancellation of the warning request is transmitted from the engine control unit 6 to the brake control unit 4. The brake control unit 4 deactivates the warning buzzer 14 in response to the cancellation of the warning request.

FIG. 15 is a flowchart showing the details of the step S1600 which is the subroutine for calculating the target acceleration (or deceleration).

In the step S1601, it is checked whether any preceding vehicle is recognized or not. When no preceding vehicle is recognized (NO in the step S1601), a target acceleration value is obtained considering no presence of any preceding vehicle in step S1609. Then, this subroutine is completed. When any preceding vehicle is recognized (i.e., YES in the step S1601), it is further checked in step S1602 whether a warning request is generated or not. When no warning request is generated (i.e., NO in the step S1602), the control flow proceeds to step S1603 to calculate the distance deviation ratio γ which is already explained in the first embodiment.

$$\gamma = \frac{\Delta d}{dm} = \frac{(d - dm)}{dm}(\%)$$

Then, in the next step S1605, a relative speed ΔV is calculated based on a distance variation between two traveling vehicles which is recognized by the laser radar 3, as explained in the first embodiment.

The processing order of the successively performed steps S1603 and S1605 can be reversed if required.

Then, in the next step S1607, a target acceleration value is obtained based on the obtained distance deviation ratio γ (step S1603) and the obtained relative speed ΔV (step S1605) with reference to the control map shown in FIG. 3B which is also explained in the first embodiment. Then, this subroutine is completed.

On the other hand, when the warning request is being generated (i.e., YES in the step S1602), a target acceleration is equalized to the maximum deceleration value obtainable for the distance control apparatus. For example, the maximum deceleration value can be set as a map value. In other words, the map data corresponding to the maximum deceleration is used. It is possible to apply a predetermined upper and/or lower limit guard in the adoption of the map data. In this case, a guard value separately set is used. Then, this subroutine is completed.

As apparent from the foregoing description, the second embodiment of the present invention equalizes the target acceleration (deceleration) during the distance control to the available maximum deceleration value (i.e., step S1608) in response to the issuance of the warning request (i.e., YES in the step S1602 of FIG. 15). In other words, the distance control apparatus of the present invention performs the deceleration control capable of obtaining the maximum deceleration always when the warning operation is performed.

In the present invention, the warning operation and the distance control are not independent from each other. Rather, the warning operation is closely correlated with the automatic distance control as an integrated vehicle behavior control system. Thus, it becomes possible to realize the automatic distance control and the warning generation cooperatively so as to match with the driver's feeling.

Reference values Aref11, Aref12, Aref21, Aref22, Aref31, Aref32 used in the above-described flowcharts are thresholds having the following meaning.

| Decelerating Means | Threshold for Instructing Operation | Threshold for Canceling Operation |
| --- | --- | --- |
| Accelerator Closing Control | Aref11 | Aref12 |
| Shift-down Control | Aref21 | Aref22 |
| Brake Control | Aref31 | Aref32 |

The relationship in magnitude between the instructing and canceling thresholds is as follows.

| Accelerator Closing Control | Aref11 < Aref12 |
| Shift-down Control | Aref21 < Aref22 |
| Brake Control | Aref31 < Aref32 |

The above-described relationship between the instructing and canceling thresholds used in each control is necessary for suppressing chattering.

The relationship between respective instructing thresholds is as follow.

$$Aref31 \leq Aref21 \leq Aref11 < 0$$

This relationship is necessary for determining the activation order among the deceleration devices. According to this relationship, the deceleration device activated first is the throttle valve which causes the smallest deceleration when closed in accordance with the accelerator closing control. The deceleration device activated second is the transmission which causes an intermediate deceleration when shift changed in accordance with the shift-down control. The deceleration device activated last is the braking device which causes the largest deceleration when operated in accordance with the brake control.

The relationship between respective canceling thresholds is as follow.

$$0 < Aref32 \leq Aref22 \leq Aref12$$

This relationship is necessary for determining the cancel order among the deceleration devices. According to this relationship, the deceleration device canceled first is the braking device which causes the largest deceleration. The deceleration device canceled second is the transmission which causes the intermediate deceleration. The deceleration device canceled last is the throttle which causes the smallest deceleration.

Miscellaneous Things

The present invention is not limited to the above-described embodiments and can be variously modified.

For example, the judgement in the step S907 can be modified in various ways. To obtain more large deceleration, a plurality of the deceleration devices can be combined.

It is possible to check in the step S907 whether the braking instruction and the third-speed shift down instruction are both sustained or not.

It is also possible to check in the step S907 whether the braking instruction, the third-speed shift down instruction and the fuel cut instruction are all sustained or not.

Furthermore, it is assumed that the maximum decelerating condition is already attained when the target acceleration is equal to the available maximum deceleration value under the condition where the braking instruction is sustained. Thus, it is possible to use these conditions for checking whether the maximum decelerating condition is already attained or not.

The above-described embodiments are based on an ordinary passenger vehicle which is capable of performing the automatic braking control, the fuel cut control, the O/D cut control, and the shift down control.

However, the present invention can be equally applied to large vehicles, such as autotrucks. The autotrucks can decelerate strongly by performing the exhaust gas braking control and the exhaust retarder control simultaneously instead of using the braking device. In this respect, the braking device is not always the deceleration device which is capable of attaining the maximum deceleration level.

The deceleration means of the present invention can be practically realized by adjusting the hydraulic braking pressure of the braking device, by partly or fully cutting the fuel supplied to the internal combustion engine (i.e., fuel cut control), by preventing the transmission from being shifted to the O/D position (i.e., O/D cut control), by causing the transmission to shift to the lower position (i.e., shift down control), by retarding the ignition timing of the internal combustion engine (i.e., ignition timing control), by forcibly connecting the input and output shafts of the torque converter (i.e., lockup control), or by increasing the flow resistance in the exhaust passage of the internal combustion engine (i.e., exhaust gas braking control, and exhaust retarder control).

The contents of the controls realized by the present invention can be variously modified.

For example, the distance between two traveling vehicles is replaceable by a time interval between two vehicles. The time interval is obtained by dividing the distance between two vehicles by the vehicle speed of the system's vehicle. In this case, the control map shown in FIG. 3B will be modified by replacing the distance deviation ratio by a time interval deviation ratio. The time interval deviation ratio $\gamma_T$ is defined by a ratio of a time interval deviation $\Delta T(=T-Tm)$ to a target time interval Tm, when "T" represents an actual time interval between the preceding vehicle and the system's vehicle and "Tm" represents the target time interval between these vehicles.

$$T = d/V$$

$$Tm = dm/V$$

$$\gamma_T = \Delta T/Tm = (T-Tm)/Tm = (d/V - dm/V)/dm/V = (d-dm)/dm = \gamma$$

In short, the time interval deviation ratio $\gamma_T$ is identical with the distance deviation ratio $\gamma$.

Furthermore, it is possible to replace the distance deviation $\Delta d$ by the actual distance "d" in obtaining another distance deviation $\gamma_A$.

$$\gamma_A = d/dm = \gamma + 1$$

Moreover, the above-described embodiments use the target acceleration (or deceleration) as the control value of the acceleration/deceleration actuator for controlling the distance between two traveling vehicles. However, the control value of the present invention is not limited to the target acceleration. For example, the target acceleration is replaceable by a target torque or a target vehicle speed.

More specifically, in the step S600 of FIG. 2 and in the step S1600 of FIG. 13, the target torque or the target vehicle speed is calculated instead of calculating the "target acceleration." In the step S607 of FIG. 3A and the step S1607 of FIG. 15, the target torque or the target vehicle speed is obtained based on the distance deviation ratio $\gamma$ and the relative speed $\Delta V$ with reference to the control map shown in FIG. 3B. In this case, the control mal of FIG. 3B is modified to obtain the target torque or the target vehicle speed variation (i.e., a required increase or decrease in the vehicle speed). In the step S609 of FIG. 3A and the step S1609 of FIG. 15, the target torque or the target vehicle speed is obtained considering no presence of any preceding vehicle. In the step S1608 of FIG. 15, the target torque or the target vehicle speed is adjusted so as to obtain the maximum deceleration.

In the steps S711, S721, S725, S731, S737, S741, S747, and S753, the acceleration deviation $\Delta\alpha$" is replaced by a torque deviation $\Delta\tau$ or a vehicle speed deviation $\Delta S$. The torque deviation $\Delta\tau$ represents a difference between the target torque and the actual (or estimated) torque of the engine. The vehicle speed deviation $\Delta S$ represents a difference between the target vehicle speed and the actual vehicle speed.

In this manner, when the torque of the engine is designated as the control value for controlling the distance between two traveling vehicles, an appropriate target torque is obtained from the control map of FIG. 3B and the vehicle behavior is controlled based on the torque deviation between the target torque and the actual (or estimated) torque.

When the vehicle speed is designated as the control value for controlling the distance between two traveling vehicles, an appropriate vehicle speed variation is obtained from the control map of FIG. 3B. The target vehicle speed is obtained by adding the obtained vehicle speed variation to the actual vehicle speed. The vehicle behavior is controlled based on the vehicle speed deviation between the target vehicle speed and the actual vehicle speed.

The main processing procedure shown in FIG. 2 or 13 and each subroutine shown in FIGS. 3A, and 4 to 12 and 14 to 15 are stored as a control program in a recording medium, such as a memory (ROM, back-up RAM) or a built-in hard disk drive, which is pre-installable in the microcomputer. However, it is possible to store the control program in a portable recording medium, such as a floppy disk, an MO (magneto-optical) disk, a CD-ROM, an external hard disk drive and a DVD (digital versatile disk), so that the control program can be arbitrarily loaded from such a recording medium to the microcomputer.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A distance control apparatus for controlling a distance between first and second traveling vehicles, said control apparatus comprising:

acceleration/deceleration means for accelerating and decelerating said second vehicle, said acceleration/deceleration means including a plurality of deceleration devices independently operable and different from each other in degree of attainable deceleration;

distance control means for performing a distance control by obtaining a control value required for controlling the distance between said first and said second traveling vehicles based on a relationship between an actual value and a target value as well as a relative speed between said first and said second traveling vehicles, and by actuating said acceleration/deceleration means based on said control value to control the distance between said first and said second traveling vehicles, said distance control means selecting at least one of said plurality of deceleration devices to decelerate said said second vehicle;

warning means for performing a warning operation correlating with said distance control performed by said distance control means, said warning means being capable of generating a warning when the distance between said first and said second traveling vehicles is shorter than a predetermined warning distance under the condition where the distance control is in progress; and warning prohibiting means for preventing said warning means from performing said warning operating when a deceleration level attainable by said at least one of said deceleration devices selected by said distance control means is lower than a predetermined maximum level even if the distance between said first and said second traveling vehicles is shorter than said predetermined warning distance.

2. The distance control apparatus in accordance with claim 1, wherein said warning prohibiting means judges that the deceleration level is higher than said predetermined maximum level when a deceleration device capable of generating a largest deceleration is included in said at least one of said deceleration devices selected by said distance control means.

3. The distance control apparatus in accordance with claim 1, wherein said warning prohibiting means judges that the deceleration level is higher than said predetermined maximum level when said control value obtained by said distance control means is equivalent to an available maximum deceleration.

4. The distance control apparatus in accordance with claim 2, wherein said deceleration device capable of generating the largest deceleration is a braking device for applying a braking force to wheels of said second vehicle.

5. The distance control apparatus in accordance with claim 4, wherein a deceleration degree attainable by said braking device during the distance control is set to be smaller than a deceleration degree attainable by a driver's depression of a braking pedal.

6. The distance control apparatus in accordance with claim 4, wherein said acceleration/deceleration means includes at least one additional deceleration device performing another function selected from the group consisting of a fuel cut control for partly or fully cutting fuel supplied to an internal combustion engine, an overdrive cut control for preventing a transmission from being shifted to an overdrive position, a shift down control for causing said transmission to shift to a lower position, an ignition timing control for retarding an ignition timing of said internal combustion engine, a lockup control for forcibly connecting input and output shafts of a torque converter, and an exhaust gas braking or retarder control for increasing a flow resistance in an exhaust passage of said internal combustion engine.

7. The distance control apparatus in accordance with claim 1, wherein said actual value is a value directly or indirectly representing an actual distance between said first and said second traveling vehicles, and said target value is a value directly or indirectly representing a target distance between said first and said second traveling vehicles.

8. The distance control apparatus in accordance with claim 7, wherein said actual value is a distance deviation between said actual distance and said target distance, and said target value is said target distance.

9. The distance control apparatus in accordance with claim 1, wherein said control value is selected from the group consisting of a target acceleration, a target torque, and a target vehicle speed.

10. A distance control apparatus for controlling a distance between first and second traveling vehicles, said control apparatus disposed in said second vehicle; said control apparatus comprising:

acceleration/deceleration means for accelerating and decelerating said second vehicle, said acceleration/deceleration means including a plurality of deceleration devices independently operable and different from each other in degree of attainable deceleration;

distance control means for performing a distance control by obtaining a control value required for controlling the distance between said first and said second traveling vehicles based on a relationship between an actual value and a target value as well as a relative speed between said first and said second traveling vehicles, and by actuating said acceleration/deceleration means based on said control value to control the distance between said first and said second traveling vehicles; and warning means for performing a warning operation, said warning means being capable of generating a warning when the distance between said first and said second traveling vehicles is shorter than a predetermined warning distance under the condition where the distance control is in progress, wherein said distance control means selects at least on of said plurality of deceleration devices to decelerate said second vehicle, and performs a deceleration control correlating with said warning operation performed by said warning means so as to obtain an available maximum deceleration of said second vehicle when said warning operation is performed by said warning means.

11. The distance control apparatus in accordance with claim 10, wherein the deceleration control of said distance control means is performed by selecting a deceleration device capable of generating a largest deceleration.

12. The distance control apparatus in accordance with claim 10, wherein the deceleration control of said distance control means is performed by setting said control value to a value corresponding to the available maximum deceleration.

13. The distance control apparatus in accordance with claim 11, wherein said deceleration device capable of generating the largest deceleration is a braking device for applying a braking force to wheels of said second vehicle.

14. The distance control apparatus in accordance with claim 13, wherein a deceleration degree attainable by said braking device during the distance control is set to be smaller than a deceleration degree attainable by a driver's depression of a braking pedal.

15. The distance control apparatus in accordance with claim 13, wherein said acceleration/deceleration means includes at least one additional deceleration device performing another function selected from the group consisting of a fuel cut control for partly or fully cutting fuel supplied to an internal combustion engine, an overdrive cut control for preventing a transmission from being shifted to an overdrive position, a shift down control for causing said transmission to shift to a lower position, an ignition timing control for retarding an ignition timing of said internal combustion engine, a lockup control for forcibly connecting input and output shafts of a torque converter, and an exhaust gas braking or retarder control for increasing a flow resistance in an exhaust passage of said internal combustion engine.

16. The distance control apparatus in accordance with claim 10, wherein said actual value is a value directly or indirectly representing an actual distance between said two traveling vehicles, and said target value is a value directly or indirectly representing a target distance between said two traveling vehicles.

17. The distance control apparatus in accordance with claim 16, wherein said actual value is a distance deviation between said actual distance and said target distance, and said target value is said target distance.

18. The distance control apparatus in accordance with claim 10, wherein said control value is selected from the group consisting of a target acceleration, a target torque, and a target vehicle speed.

19. A distance control method for controlling a distance between first and second traveling vehicles, said control method comprising:

obtaining a relationship between an actual value and a target value;

obtaining a relative speed between said first and said second traveling vehicles;

generating a control value required for controlling the distance between said first and said second traveling vehicles;

selecting at least one of a plurality of deceleration devices to decelerate said second vehicle, said plurality of deceleration devices being independently operable and different from each other in degree of attainable deceleration; and generating a warning only when a deceleration level attainable by said selected one or plural deceleration devices is higher than a predetermined maximum level even if the distance between said first and said second traveling vehicles is shorter than a predetermined warning distance.

20. The distance control method in accordance with claim 19, wherein the deceleration level attainable by said selected one or plural deceleration devices is judged to be higher than said predetermined maximum level when a deceleration device capable of generating a largest deceleration is selected.

21. The distance control method in accordance with claim 19, wherein the deceleration level attainable by said selected one or plural deceleration devices is judged to be higher than said predetermined maximum level when said control value is equivalent to an available maximum deceleration.

22. The distance control method in accordance with claim 20, wherein said deceleration device capable of generating the largest deceleration is a braking device for applying a braking force to wheels of said second vehicle.

23. The distance control method in accordance with claim 22, wherein a deceleration degree attainable by said braking device during the distance control is set to be smaller than a deceleration degree attainable by a driver's depression of a braking pedal.

24. The distance control method in accordance with claim 22, wherein there is at least one additional deceleration device performing another function selected from the group consisting of a fuel cut control for partly or fully cutting fuel supplied to an internal combustion engine, an overdrive cut control for preventing a transmission from being shifted to an overdrive position, a shift down control for causing said transmission to shift to a lower position, an ignition timing control for retarding an ignition timing of said internal combustion engine, a lockup control for forcibly connecting input and output shafts of a torque converter, and an exhaust gas braking or retarder control for increasing a flow resistance in an exhaust passage of said internal combustion engine.

25. The distance control method in accordance with claim 19, wherein said actual value is a value directly or indirectly representing an actual distance between said first and said second traveling vehicles, and said target value is a value directly or indirectly representing a target distance between said first and said second traveling vehicles.

26. The distance control method in accordance with claim 25, wherein said actual value is a distance deviation between said actual distance and said target distance, and said target value is said target distance.

27. The distance control method in accordance with claim 19, wherein said control value is selected from the group consisting of a target acceleration, a target torque, and a target vehicle speed.

28. A distance control method for controlling a distance between first and second traveling vehicles, said control method comprising the steps of:

obtaining a relationship between an actual value and a target value;

obtaining a relative speed between said first and said second traveling vehicles;

generating a control value required for controlling the distance between said first and said second traveling vehicles;

providing a plurality of deceleration devices in said second vehicle;

selecting at least one of said plurality of deceleration devices in accordance with said control value, said plurality of deceleration devices being independently operable and different from each other in degree of attainable deceleration; and performing a deceleration control in correlation with a warning operation so as to obtain and available maximum deceleration of said second vehicle when said warning operation is performed.

29. The distance control method in accordance with claim 28, wherein the deceleration control is performed by selecting a deceleration device capable of generating a largest deceleration.

30. The distance control method in accordance with claim 28, wherein the deceleration control is performed by setting said control value to a value corresponding to the available maximum deceleration.

31. The distance control method in accordance with claim 29, wherein said deceleration device capable of generating the largest deceleration is a braking device for applying a braking force to wheels of said second vehicle.

32. The distance control method in accordance with claim 31, wherein a deceleration degree attainable by said braking device during the distance control is set to be smaller than a deceleration degree attainable by a driver's depression of a braking pedal.

33. The distance control method in accordance with claim 31, wherein there is at least one additional deceleration device performing another function selected from the group consisting of a fuel cut control for partly or fully cutting fuel supplied to an internal combustion engine, an overdrive cut control for preventing a transmission from being shifted to an overdrive position, a shift down control for causing said transmission to shift to a lower position, an ignition timing control for retarding an ignition timing of said internal combustion engine, a lockup control for forcibly connecting input and output shafts of a torque converter, and an exhaust gas braking or retarder control for increasing a flow resistance in an exhaust passage of said internal combustion engine.

34. The distance control method in accordance with claim 28, wherein said actual value is a value directly or indirectly representing an actual distance between said first and said second traveling vehicles, and said target value is a value directly or indirectly representing a target distance between said first and said second traveling vehicles.

35. The distance control method in accordance with claim 34, wherein said actual value is a distance deviation between said actual distance and said target distance, and said target value is said target distance.

36. The distance control method in accordance with claim 28, wherein said control value is selected from the group consisting of a target acceleration, a target torque, and a target vehicle speed.

37. A recording medium storing a control program for controlling a distance between first and second traveling vehicles, said recording medium being installable in a computer system for performing the steps of:

obtaining a relationship between an actual value and a target value;

obtaining a relative speed between said first and said second traveling vehicles;

generating a control value required for controlling the distance between said first and said second traveling vehicles;

selecting at least one of a plurality of deceleration devices to decelerate said second vehicle, said plurality of deceleration devices being independently operable and different from each other in degree of attainable deceleration; and generating a warning only when a deceleration level attainable by said selected one or plural deceleration devices is higher than a predetermined maximum level even if the distance between said first and said second traveling vehicles is shorter than a predetermined warning distance.

38. A recording medium for controlling a distance between first and second traveling vehicles, said recording medium being installable in a computer system for performing the steps of:

obtaining a relationship between an actual value and a target value;

obtaining a relative speed between said first and said second traveling vehicles;

generating a control value required for controlling the distance between said first and said second traveling vehicles;

selecting at least one of a plurality of deceleration devices of said second vehicle in accordance with said control value, said plurality of deceleration devices being independently operable and different from each other in degree of attainable deceleration; and performing a deceleration control in correlation with a warning operation so as to obtain an available maximum deceleration of said second vehicle when said warning operation is performed.

* * * * *